(12) United States Patent
Wakatani (10) Patent No.: US 7,904,650 B2
(45) Date of Patent: Mar. 8, 2011

(54) DATA STORAGE APPARATUS AND DATA READING METHOD

(75) Inventor: Shigeki Wakatani, Kanagawa (JP)

(73) Assignee: Sony Corporation, Tokyo (JP)

( * ) Notice: Subject to any disclaimer, the term of this patent is extended or adjusted under 35 U.S.C. 154(b) by 1080 days.

(21) Appl. No.: 11/656,786

(22) Filed: Jan. 23, 2007

(65) Prior Publication Data

US 2007/0172205 A1    Jul. 26, 2007

(30) Foreign Application Priority Data

Jan. 25, 2006   (JP) ............................... P2006-016616

(51) Int. Cl.
*G06F 13/00*    (2006.01)
(52) U.S. Cl. ...................... 711/114; 714/770; 386/344
(58) Field of Classification Search .................. 386/344, 386/353; 711/11–114; 714/763, 769, 770
See application file for complete search history.

(56) References Cited

U.S. PATENT DOCUMENTS 6,374,269 B1 *  4/2002  Ishikawa et al. ...................... 1/1
2002/0035670 A1 *  3/2002  Okabayashi et al. ......... 711/114

FOREIGN PATENT DOCUMENTS

| JP | 2001 100944 | 4/2001 |
| JP | 2003 174624 | 6/2003 |
| JP | 2003 303056 | 10/2003 |

* cited by examiner

*Primary Examiner* — Thai Tran
*Assistant Examiner* — Mishawn Dunn
(74) *Attorney, Agent, or Firm* — Frommer Lawrence & Haug LLP; William S. Frommer (57) ABSTRACT

A data storage apparatus using a plurality of hard disk drives for storing stream data includes a command receiving portion for receiving a stream data read command from the outside; and a data processing portion reading the stream data stored in the hard disk drives upon receiving the read command, assembling the data, and transferring the assembled stream data to the outside. The apparatus further includes a control portion performing control of determining maximum time from receiving the read command to completing the assembly of the stream data, terminating the data read from the hard disk drives in the case where the maxim time has elapsed, and preparing the stream data transferred to the outside in the data processing portion only using data having been read; and a managing portion variably setting the maximum time according to a bit rate of the stream data read on the read command.

5 Claims, 7 Drawing Sheets

| Bit Rate | Time-Out Period |
|----------|-----------------|
| Rate a   | Ta [ms]         |
| Rate b   | Tb [ms]         |
| Rate c   | Tc [ms]         |
| ⋮        | ⋮               |

FIG. 7

DATA STORAGE APPARATUS AND DATA READING METHOD

CROSS REFERENCES TO RELATED APPLICATIONS

The present invention contains subject matter related to Japanese Patent Application JP 2006-016616 filed in the Japanese Patent Office on Jan. 25, 2006, the entire contents of which being incorporated herein by reference.

BACKGROUND OF THE INVENTION

1. Field of the Invention

The present invention relates to an apparatus using HDDs (Hard Disk Drives) for storing stream data and to a data reading method applied to the apparatus.

2. Description of the Related Art

Recently, an HDD array unit including a plurality of HDDs has been used in a broadcasting station and in post-production to obtain a large capacity for a storage apparatus that stores stream data such as AV (Audio/Video) data.

For example, such HDD array unit is included in an AV server used as an editing system and broadcasting system in a broadcasting station. The AV server has a plurality of input/output ports for AV data, and transfers the AV data at a high speed between the input/output ports and the HDD array unit.

High operational reliability and real-time responsiveness may be required for the AV server, since the AV server is supposed to operate continuously for 24 hours a day and 365 days a year and, in addition, an interruption or delay of video and audio is not permitted while programs are on-air.

However, the HDD is a device whose operational reliability and real-time responsiveness (response performance) are not so high. Because of that, the AV server includes the HDD array unit of a RAID (Redundant Arrays of Inexpensive Disks) configuration having redundancy, and further supports functions to cope with various failures. Data correction function using parity, data restoration function by rebuilding, data reassignment processing function (if a response delay occurs in a certain HDD, data thereof are output after being corrected using another HDD), and MTTR (Mean Time To Repair) reduction function by mounting a spare HDD can be supported in the AV server, for example.

Japanese Unexamined Patent Application Publication No. 2005-182658 discloses an example of a data recording and reproducing apparatus having a RAID configuration for storing AV data.

SUMMARY OF THE INVENTION

When AV data being stream data are read from an AV server to be reproduced, read processing of the AV data may need to be completed in real time in order to reproduce the AV data without interruption. Normally, a RAID apparatus storing various kinds of data may not have much restriction on the time for reading the data. However, in the case of storing AV data, time control is performed at a high level so that the read processing of the AV data can be completed in real time and no disturbance is caused for a time axis of data reproduction.

In the data recording and reproducing apparatus having the RAID configuration for AV data described in the Japanese Unexamined Patent Publication Application No. 2005-182658, a time-out period is defined when performing reproducing processing. In the case where read processing of reproduced data may not be completed within real time (in the case of time-out), the reproduction is carried out continuously with priority given to the time axis, even if part of video data and audio data are absent. The time-out period is set in consideration of time and other conditions for data transfer by HDDs included in the data recording and reproducing apparatus.

However, in such apparatus for recording and reproducing AV data, various AV data having different bit rates are stored. Accordingly, for example, if the time-out period is defined uniformly, there may occur such case that part of reproduced data is absent due to running out of time when reproducing the AV data of low bit rate, although there still remains time. Therefore, there may be the case of inappropriate time-out processing. Particularly, since two or more kinds of data such as AV data of standard picture quality and AV data of high definition picture quality have been lately recorded in one AV server in a mixed manner, necessity for recording data differing in reproducing bit rates for unit time increases.

Accordingly, it is desirable to appropriately set a time-out period necessary to reproduce stream data without disturbing a reproducing time axis, in the case where the stream data are stored in the AV server using HDDs, for example.

According to an embodiment of the present invention, in the case where stream data stored in a plurality of hard disk drives are read, upon receiving a stream data read command from the outside, data processing is performed. The data processing includes: reading the stream data stored in the plurality of hard disk drives, assembling the data, and transferring the assembled stream data to the outside. Maximum time from receiving the read command to completing the assembly of the stream data is defined and the reading of the data from the hard disk drives is terminated in the case where the defined maximum time has elapsed. The stream data transferred to the outside are prepared by only using the data having been read at that time. Further, the maximum time is variably set according to a bit rate of the stream data read on the read command.

According to the embodiment of the present invention, since the maximum time from receiving the read command to completing the assembly of the stream data varies according to the bit rate of the data being read, the maximum time is set to be sufficient for reproducing processing of the bit rate of the stream data to be read. Therefore, relatively long maximum time can be set when the stream data of a low bit rate are reproduced, for example, and the reproduced data can be prevented from being partly absent in the case of taking long time to read the stream data from the hard disk drives.

According to the embodiment of the present invention, relatively long maximum time can be set when the stream data of a low bit rate are reproduced, for example. Therefore, the reproduced data can be prevented from being partly absent in the case of taking long time to read the stream data from the hard disk drives due to some cause. Accordingly, stream data can be, reproduced without absent data and with securing the time axis.

DESCRIPTION OF THE PREFERRED EMBODIMENTS

Figure 1:
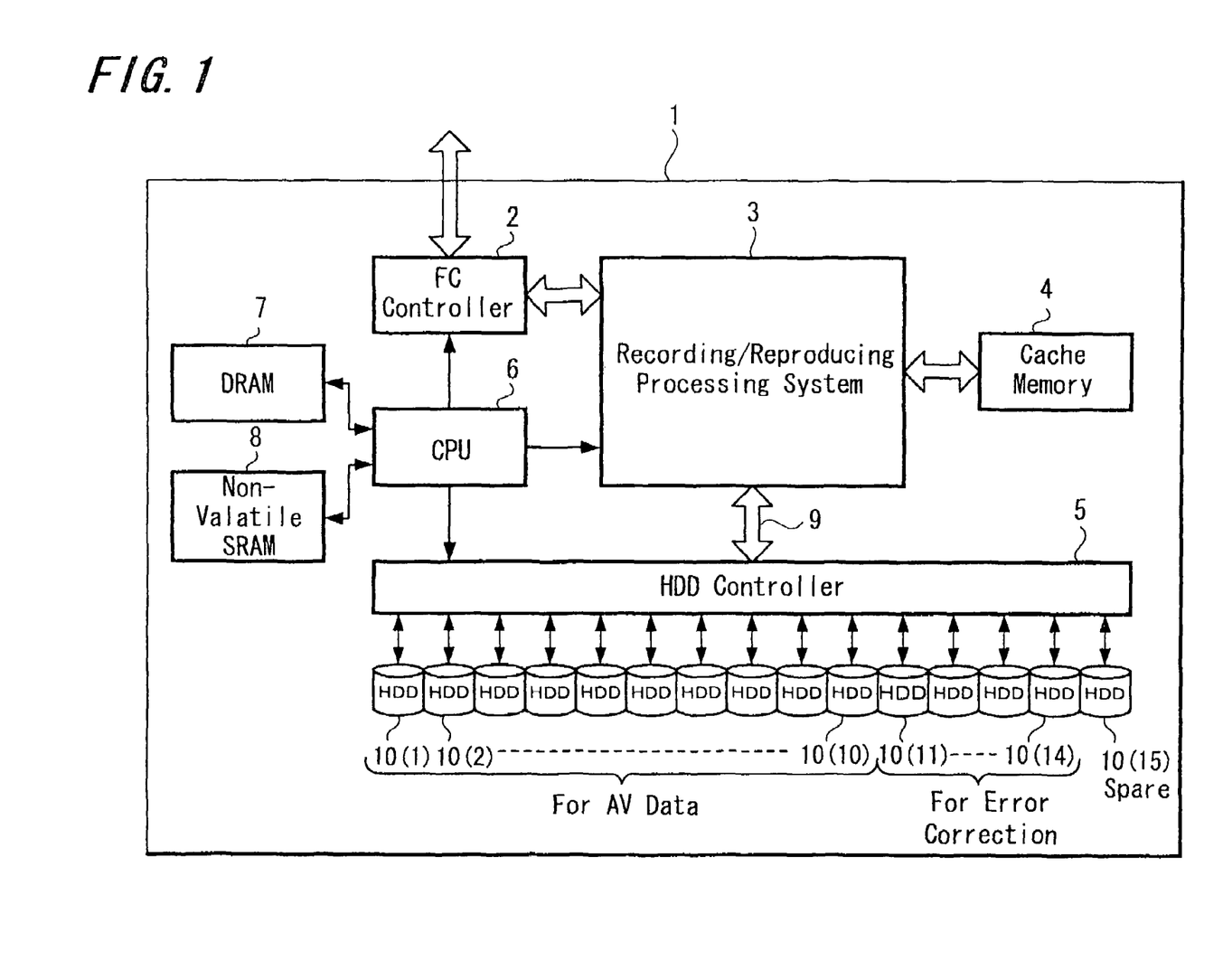
FIG. 1 is a block diagram showing a configuration of a storage portion of an AV server to which an embodiment of the present invention is applied.

Hereinafter, an example in which an embodiment of the present invention is applied to a storage apparatus for an AV server used in a broadcasting station is specifically explained using the accompanied drawings. FIG. 1 is a block diagram showing a configuration of a storage portion of the AV server to which the embodiment of the present invention is applied. The storage portion 1 includes an FC (Fiber Channel) controller 2, a recording/reproducing processing system 3, a cache memory 4, an HDD controller 5, a CPU 6, a DRUM 7, and a non-volatile SRAM 8. The recording/reproducing processing system 3 and the HDD controller 5 are connected using a bus 9 of PCI-X standard.

In addition, fifteen HDDs 10 (HDD 10(1) through HDD 10(15)) are included in the storage portion 1. Among the fifteen HDDs 10, ten HDDs 10(1) through 10(10) are used for AV data, four HDDs 10(11) through 10(14) are used for error correction, and the remaining one HDD 10(15) is a spare.

HDDs manufactured and sold as a standard (HDDs for use as external memories of a computer) by manufacturers of the HDDs are used as those HDDs 10.

The FC controller 2 is an interface for sending AV data to and receiving AV data from the outside via a fiber channel. The recording/reproducing processing system 3 is configured to have an FPGA that is a programmable LSI, and performs processing on the AV data recorded in the HDDs 10 and on the AV data reproduced from the HDDs 10.

The cache memory 4 is an SDRAM of DIMM (Dual Inline Memory Module) standard for buffering AV data. The HDD controller 5 is an SATA controller in the case where HDDs supporting an SATA (Serial ATA) is used as the HDDs 10, for example.

The CPU 6 controls the whole storage portion 1. The DRAM 7 is a main memory of the CPU 6. The non-volatile SRAM 8 is used by the CPU 6 to store log data and is further used for storing an HDD information table and the like.

AV data received by the FC controller 2 is sent to the recording/reproducing processing system 3 when recording the AV data in the storage portion 1. The recording/reproducing processing system 3 prepares an error correction code (Reed-Solomon code) from the AV data. Further, the AV data to which the error correction code is added are striped into data of ten channels for recording AV data in the respective HDDs 10(1) through 10(10) and data of four channels for recording the Reed-Solomon code in the HDDs 10(11) through 10(14) for error correction. Then, the data of fourteen channels in total are sent to the HDDs 10(1) to 10(14) through the HDD controller 5 while buffering the data in the cache memory 4, and with the storage portion 1 having such RAID configuration, the data are distributed and recorded in the HDDs 10(1) through 10(14). It should be noted that management of bit rate information on the recorded AV data is performed when recording the AV data in respective HDDs 10(1) through 10(14). Specifically, the bit rate information on the AV data is stored in the non-volatile memory 8 connected to the CPU 6, for example, and the CPU 6 performs the management at the time of reproduction based on the stored information (bit rate information).

When reproducing AV data from the storage portion 1, the AV data and Reed-Solomon code read from respective HDDs 10(1) through 10(14) are sent to the recording/reproducing processing system 3 through the HDD controller 5. The recording/reproducing processing system 3 performs destriping (reconstructing the data and code into the state before striping) while buffering those data and code in the cache memory 4. Further, the error correction of the AV data is performed using the Reed-Solomon code, and the error corrected AV data are transmitted from the FC controller 2 to the outside.

In addition, the recording/reproducing processing system 3 starts rebuilding when a failure or response delay occurs in any of the HDDs 10(1) through 10(14) during the reproduction of the data. More specifically, data in the failed HDD among the HDDs 10(1) through 10(14) are restored with the data read from the remaining HDDs 10(1) through 10(14) using the Reed-Solomon code, and the restored data are recorded in the spare HDD 10(15).

Figure 2:
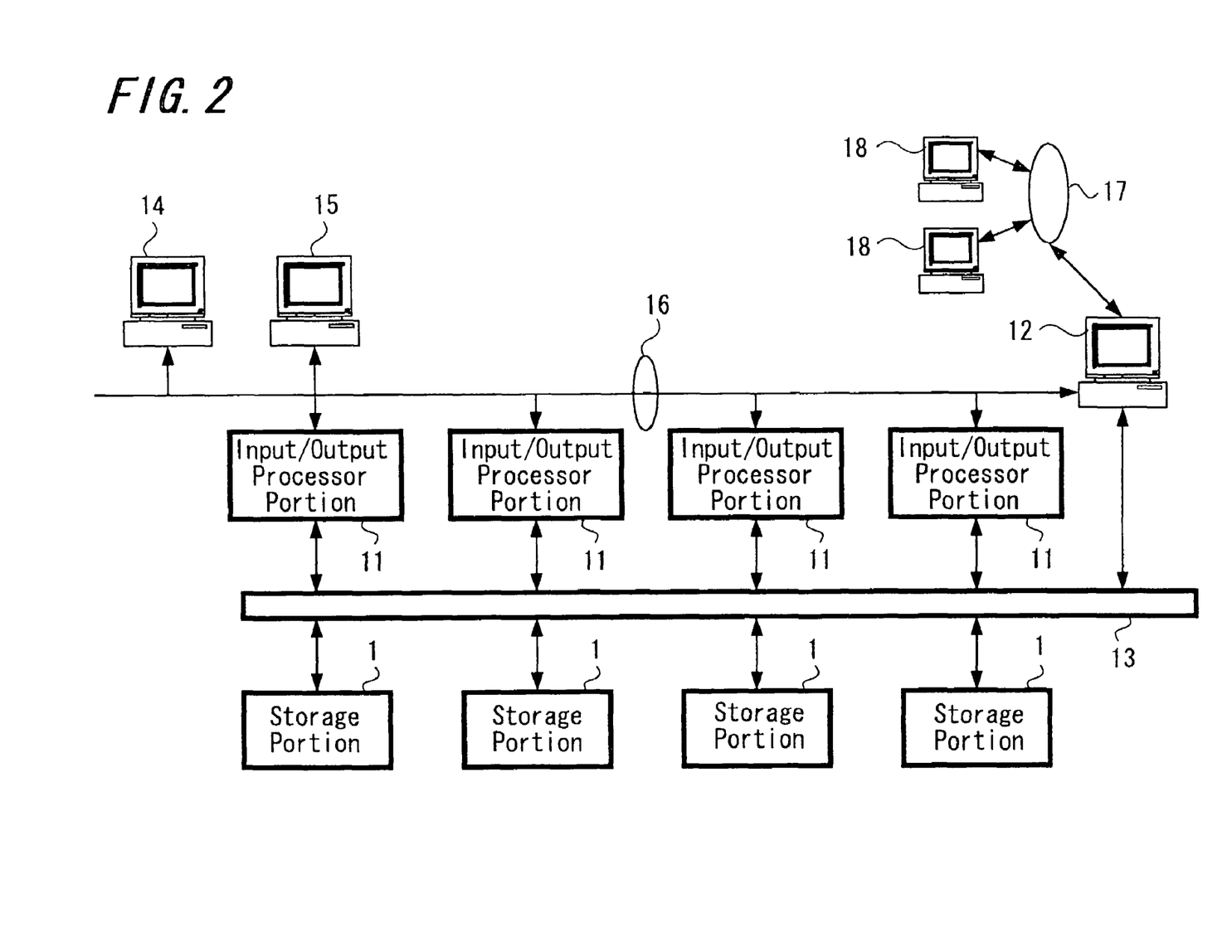
FIG. 2 is a diagram showing a system configuration of an AV server according to an embodiment of the present invention.

FIG. 2 is a diagram showing a system configuration of an AV server using the storage portions 1 shown in FIG. 1 provided in a broadcasting station. In this AV server, a plurality of the storage portions 1, a plurality of input/output processor portions 11, and a relay terminal 12 are connected using an FC (Fiber Channel) switch 13. Further, each of the input/output terminals 11, the relay terminal 12, a managing terminal 14, and a maintenance terminal 15 are connected using Ethernet® 16.

Each of the input/output processor portions 11 has a plurality of (six, for example) input/output ports through which AV data are input from and output to the outside in a synchronous transfer format such as SDI (Serial Digital Interface) or asynchronous transfer format.

Each of the input/output processor portion 11 encodes (compresses) AV data input into the input/output ports using a predetermined coding method and transfers the encoded data to the storage portion 1 via the FC switch 13. Further, the input/output processor portion 11 decodes (decompresses) the data transferred from the storage portion 1 via the FC switch 13 to be output from the input/output ports.

A configuration of an input/output processor portion of a typical AV server has been known and the configuration of the input/output processor portion of the AV server to which an embodiment of the present invention is applied may have such typical configuration, and so a detailed explanation thereof will be omitted.

The relay terminal 12 is connected to a plurality of editing terminals 18 through a network 17, relays AV data transfer between the storage portions 1 and the editing terminals 18, and relays information transfer between the editing terminals 18, and the input/output processor portions 11 and the managing terminal 14.

The managing terminal 14 retains information such as a memory address of the AV data in the storage portion 1 and file name/attribute of the AV data, and sends the retained information to the input/output processor portions 11 and relay terminal 12 in response to a request from the input/output processor portions 11 and relay terminal 12 via the Ethernet® 16.

The maintenance terminal 15 operated by maintenance personnel displays log data prepared and stored in each of the storage portions 1 and each of the input/output processor portions 11 so that a state of the AV server is analyzed to decide replacement of the HDD or the like based on an alarm displayed at the time of a HDD failure in the storage portion 1. In addition, the maintenance terminal 15 is also used for renewing the HDD information table in the storage portion 1 as described later on.

Figure 5A:
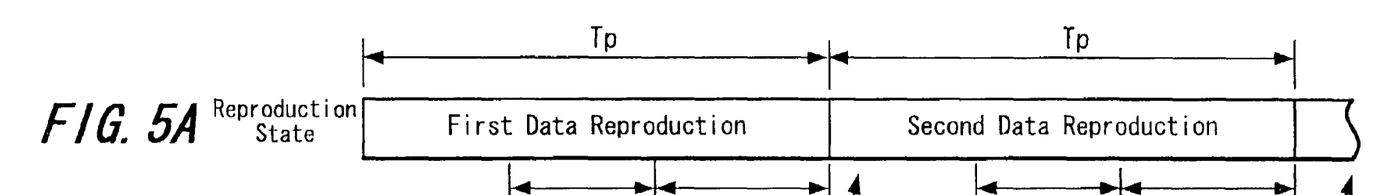
FIGS. 5A to 5D are time charts showing an example of a reproducing state (an example of normal reproduction) according to an embodiment of the present invention.

Next, an explanation is made regarding processing of setting a time-out period that is a maximum time of processing defined when reading data in the storage portion 1 in this embodiment. First, an outline of this embodiment in a state of the reproduction being performed after deciding the time-out period is explained by referring to a data reproducing state shown in FIGS. 5A to 5D. AV data are recorded in the HDDs in the storage portion 1 as the data in which a predetermined data volume is set as a unit. As shown in FIG. 5A, the reproduction is performed continuously by the unit of a fixed time Tp such as reproduction of first data, reproduction of second data and so on, for example. One unit of data reproduction time Tp is around 0.5 sec, for example, in the case of reproducing AV data of a standard bit rate. However, one unit of data reproduction time Tp varies depending on the bit rate of the recorded data as described later on, and becomes longer than 0.5 sec in the case of the AV data having a lower bit rate. While the reproduction is being performed in the unit of reproduction time Tp, the next unit of AV data is read in the storage portion 1 and output to the input/output processors 11 (FIG. 2). For example, the second data are read from the HDDs in the storage portion 1 to be transferred during the reproduction of the first data as shown in FIG. 5A.

Figure 5B:
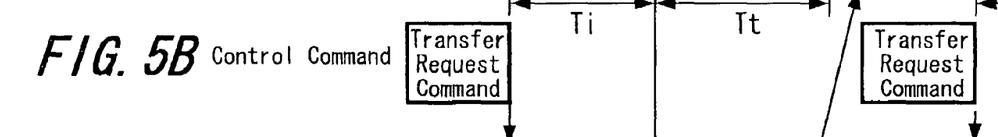
Figure 5C:
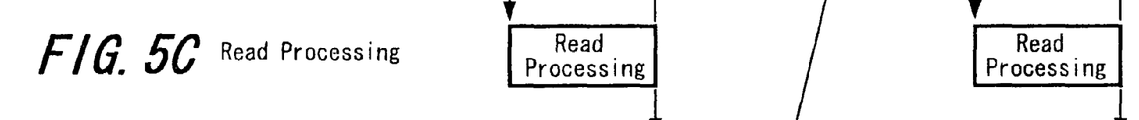

In order to read the data, upon sending a read command (transfer request command) from the input/output processor 11, as shown in FIG. 5B, the following control is performed in the storage portion 1. Specifically, the FC controller 2 receives the read command and sends the received command to the CPU 6 representing a controller which performs control of reading the AV data of a period designated by the command from the HDDs 10 through the HDD controller 5. Here, the storage portion 1 in this embodiment is configured to have a RAID configuration in which a plurality of HDDs 10 are provided so that data are distributed and recorded in the plurality of HDDs 10. Therefore, the read request is given to all the HDDs 10 in which the designated data are recorded. When the read command is given to the HDDs 10, the corresponding data are read from respective HDDs 10 and sent to the recording/reproducing processing system 3. The read data are assembled in the recording/reproducing processing system 3. Read processing shown in FIG. 5C corresponds to the processing in the recording/reproducing processing system 3 where the maximum time Ti for the processing has been determined. After the maximum time Ti has been elapsed, the processing is in the state of time-out Tx described later on.

Figure 5D:
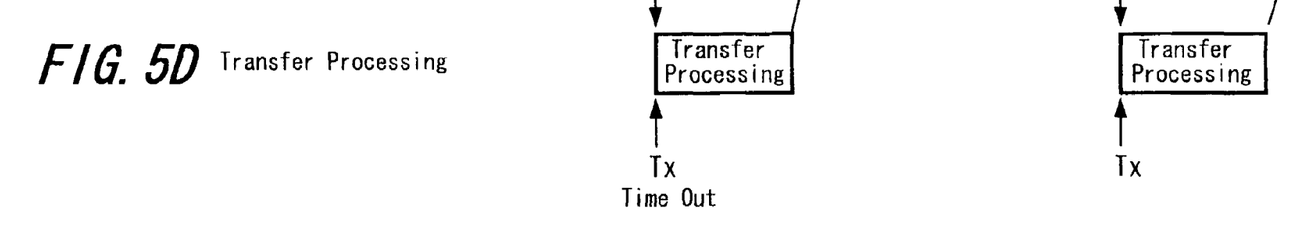

Further, when the read data are assembled in the recording/reproducing processing system 3, the assembled data are sent to the FC controller 2 and then sent from the FC controller 2 to the outside (input/output processor 11). Transfer processing shown in FIG. 5D shows time necessary for the data transfer from the recording/reproducing processing system 3 to the FC controller 2 and the data transfer to the outside. If the transfer is completed within time Tt until the end of the reproduction of the data being reproduced at present, the transferred data can be reproduced continuously following the present data. The maximum time Ti for the data processing is set to 130 msec, for example, and the maximum time Tt for the transfer is set to 250 msec, for example. Therefore, the timing to send the transfer request command shown in FIG. 5B is set to the time prior to the timing of ending the reproduction of the data of the present period by the processing time Ti plus transfer time Tt. Specifically, the transfer request command is sent when a predetermined time determined in advance has elapsed after starting the reproduction of the data of each unit.

In this embodiment, the time-out Tx is judged by the CPU 6 in order to judge whether the maximum processing time Ti has elapsed, and the time-out period is variably set depending on the bit rate of the AV data being reproduced.

Figure 3:
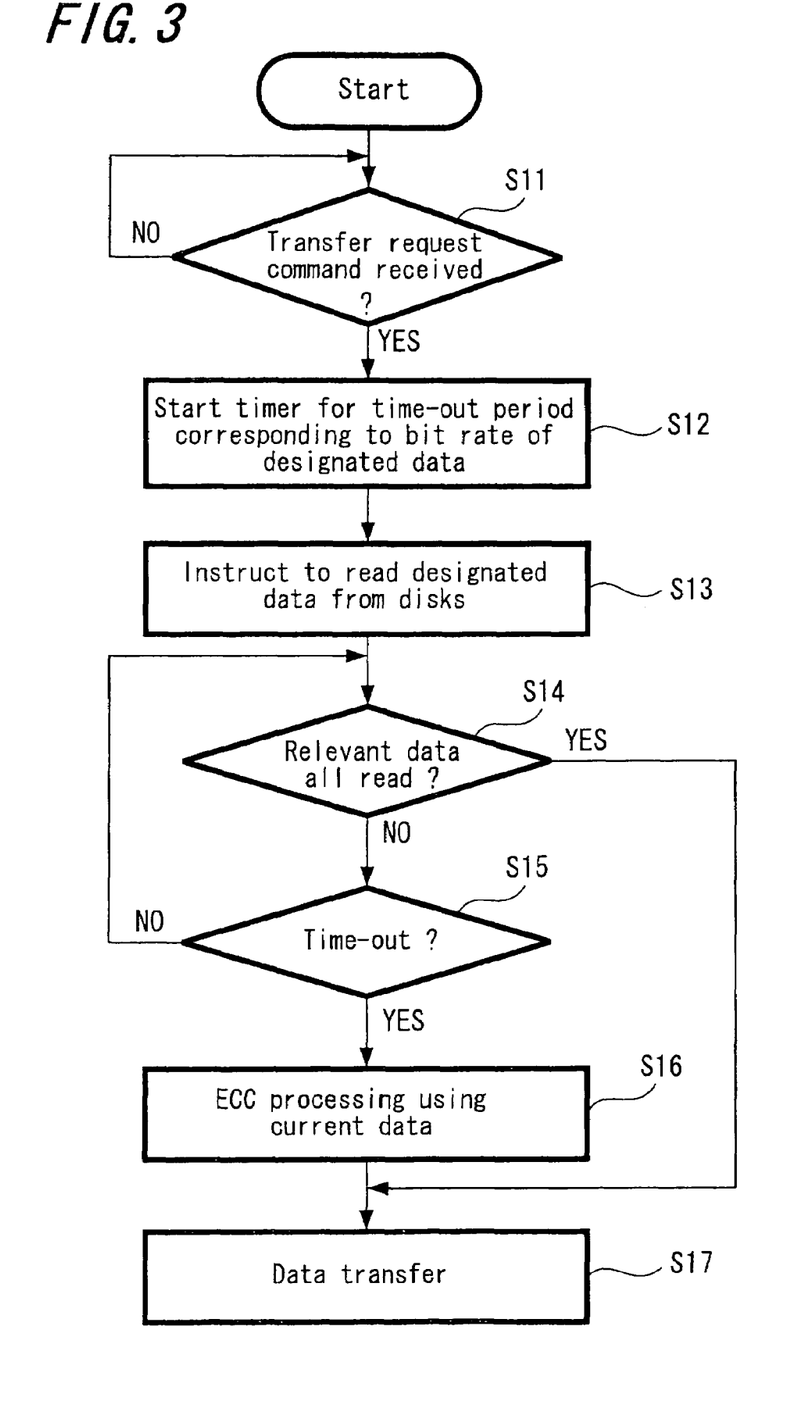
FIG. 3 is a flow chart showing time-out processing of an embodiment of the present invention.

Next, a specific processing example in which the time-out period is variably set in the storage portion 1 is explained by referring to a flow chart in FIG. 3. In the storage portion 1, first it is judged whether a transfer request command is received from the outside (from the input/output processors 11) (Step S11) and with respect to this processing, the storage portion 1 is in a standby state until receiving the transfer request command. Upon receiving the transfer request command, the CPU 6 determines the bit rate of the transfer data designated by the transfer request command, sets the time-out period appropriate for the determined bit rate, and starts a timer to judge the elapse of the set time-out period (Step S12). The timer is included in the CPU 6, for example.

Figure 4:
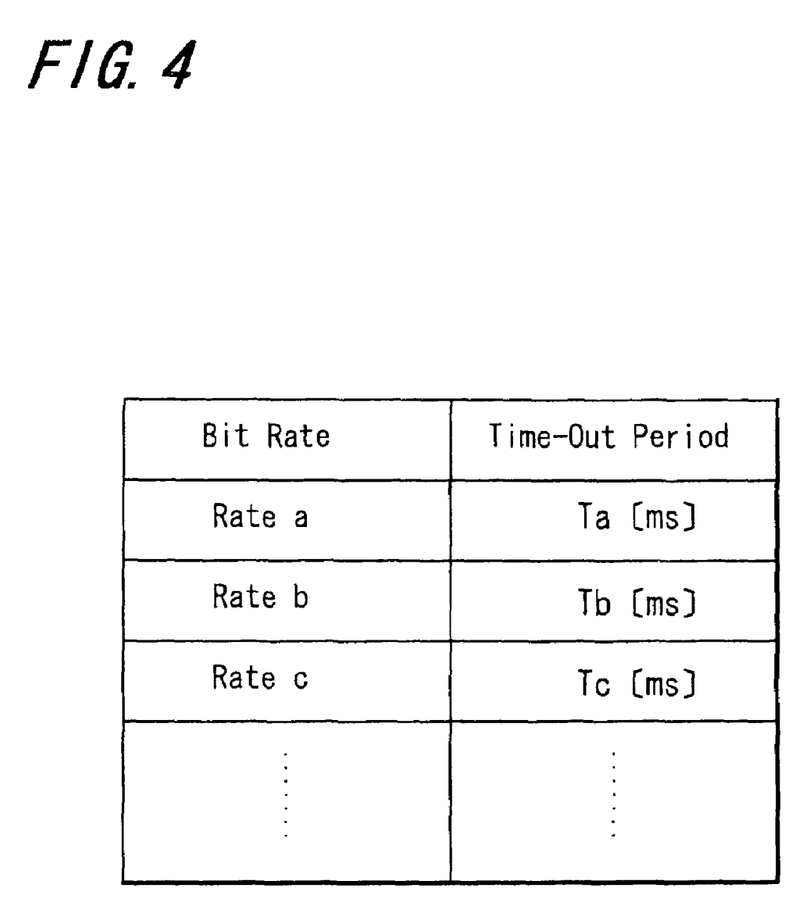
FIG. 4 is an explanatory diagram showing examples of time-out periods according to an embodiment of the present invention.

FIG. 4 is a table showing bit rates and corresponding time-out periods, for example, which is prepared beforehand in the non-volatile SRAM 8 for setting up the time-out period suitable for the bit rate. Specifically, the time-out period is Ta [msec] when the bit rate is a; the time-out period is Tb [msec] when the bit rate is b, as shown in the figure, and the lower the bit rate is, the longer the time-out period is set Returning to the explanation of the flow chart of FIG. 3, the CPU 6 next gives an instruction to read the data designated by the command from the HDDs through the HDD controller 5 (Step S13). After giving the instruction, the CPU 6 judges whether all the AV data of the relevant unit are read in the recording-reproducing processing system 3 (Step S14). In the case where it is judged that all the data have not been read yet, it is judged whether the time-out period set in Step S12 has elapsed (Step S15), and the processing returns to the judgment of Step S14 in the case where the time-out period has not elapsed.

In the case where it is judged that all the data are read in Step S14, processing of assembling the read data is performed and the assembled data are transferred to the outside through the FC controller 2 (Step S17). Further, in the case where the CPU 6 judges in Step S15 that the time-out period has elapsed, the error correction processing is performed in the recording-reproducing processing system 3 using the data having been read from the HDDs. In the error correction processing, absent data are restored using the Reed-Solomon code recorded in the error correction HDDs 10(11) through 10(14) (Step S16), and the error-corrected data are transferred (Step S17). Here, in the case where there is a unit in which data are unable to be restored with the error correction processing, only frames for the data are transferred, thereby preventing the time axis for reproducing the data from being disturbed.

Figure 6A:
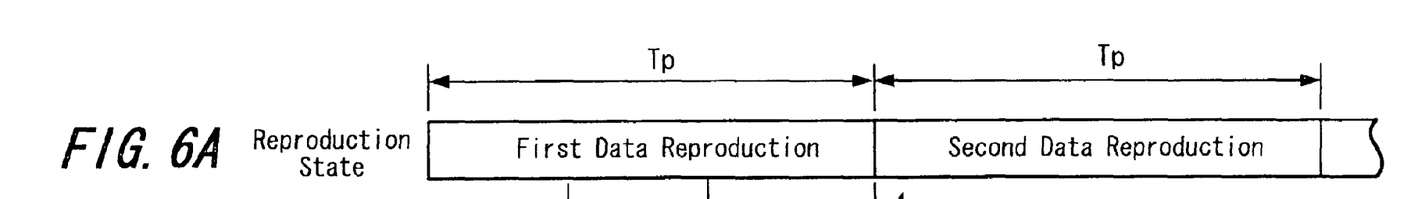
FIGS. 6A to 6E are time charts showing an example of a reproducing state (an example when time-out occurs) according to an embodiment of the present invention.
Figure 6B:
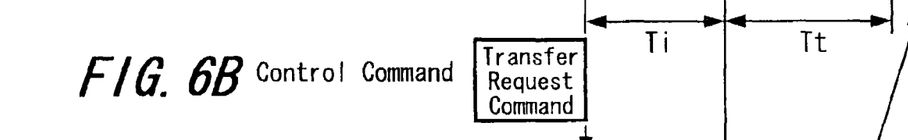
Figure 6C:
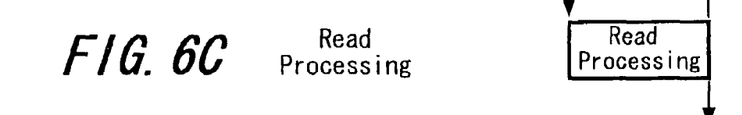
Figure 6D:
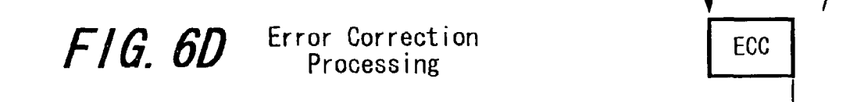
Figure 6E:
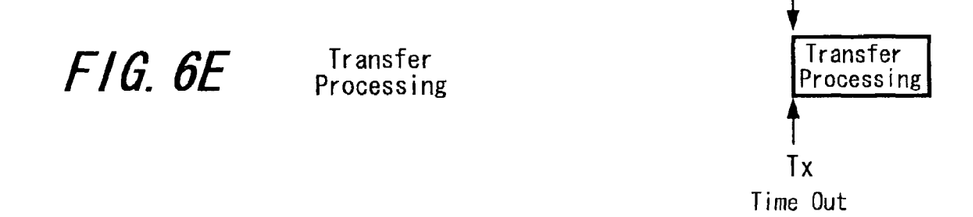

With the reproducing processing being performed in such manner, the data reproduction described in FIGS. 5A to 5D is continuously performed in the state where the processing of reading data from the HDDs is correctly performed. Further, in the case where it takes time to read the data from the HDDs and the time-out period has elapsed due to some cause, the processing is performed as shown in FIGS. 6A to 6E, for example. Specifically, as shown in FIG. 6A, in the case where the transfer request command of the second data (FIG. 6B) is received during the reproduction of the first data, the processing of reading the data designated by the command from the HDDs is executed (FIG. 6C). Here, it is assumed that the read processing is not finished after the elapse of the time-out period. Then, the error correction processing is performed using the data having been read before the time-out Tx (FIG. 6D) and the error corrected data is transferred (FIG. 6E).

With the time-out period being set as described above, the data reading processing can be performed without delay in the real-time reproduction of the AV data. Further, in this embodiment, the time-out period is variably set according to the bit rate of the AV data read and reproduced from the HDDs. Accordingly, one reproduction unit Tp is long when, for example, reproducing AV data of low bit rate (refer to FIGS. 5A to 5D), however, the time-out period can also be long, thereby securing time allowed for reading the data from the HDDs, making the probability of reading the AV data correctly from the HDDs high, and obtaining high reliability as the data recording and reproducing apparatus.

Figure 7:
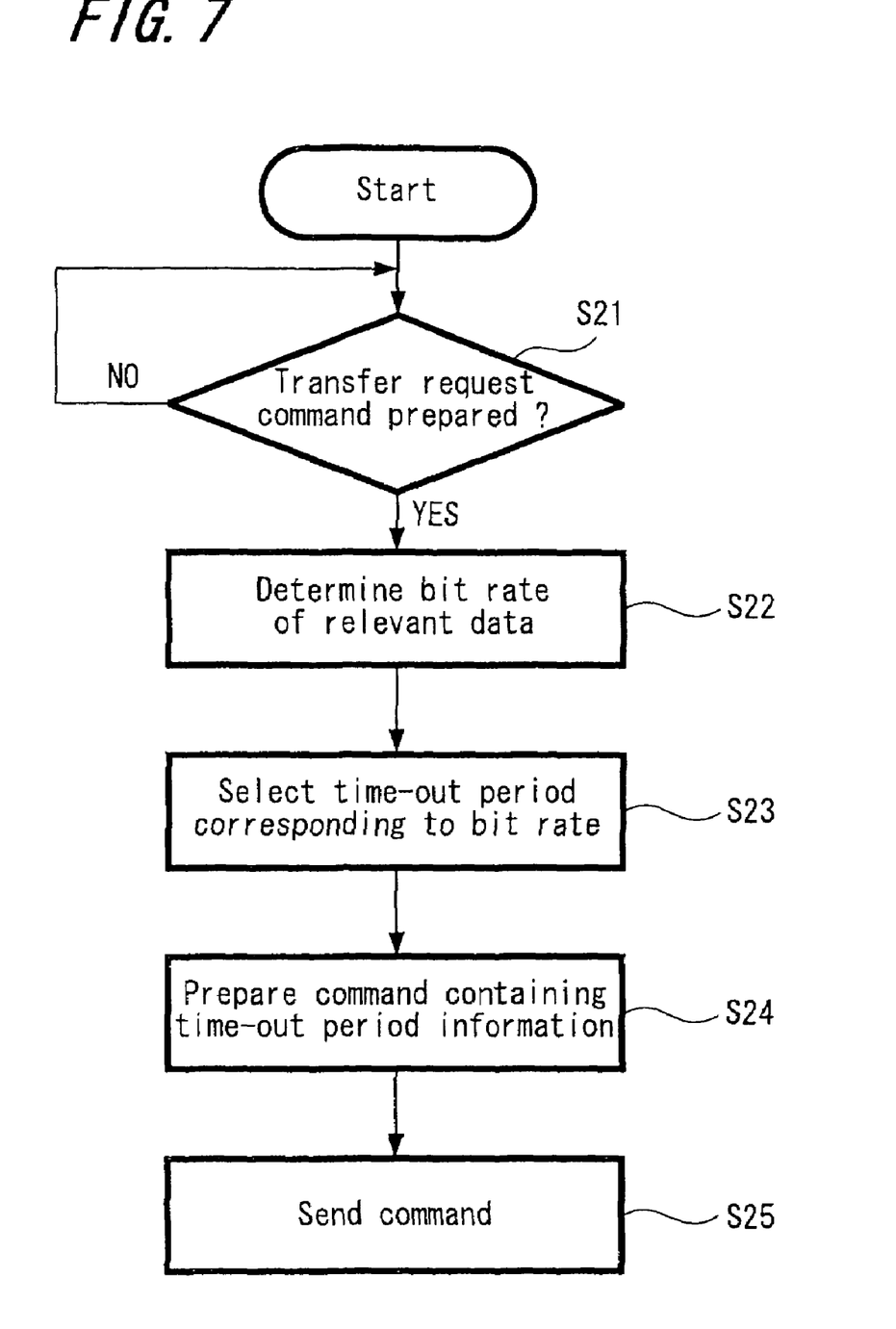
FIG. 7 is a flow chart showing an example of command preparation processing according to another embodiment of the present invention.

The time-out period is set in the storage portion in the embodiment described above. However, the time-out period may be variably set as described in the followings. Specifically, when sending the transfer request command from the outside such as the input/output processor to the storage portion, the time-out period or reproduction bit rate is concurrently indicated, and the time-out period is set in the storage portion based on that indication. FIG. 7 is a flow chart showing an example of command preparing processing in the input/output processor 11 (FIG. 2) in such case. Explaining this processing based on the flow chart in FIG. 7, whether it is the timing of preparing the transfer request command is judged (Step S21). The bit rate of the data to be reproduced is determined when the timing comes (Step S22). The time-out period corresponding to the determined bit rate is selected (Step S23). The transfer request command including the information on the selected time-out period is prepared (Step S24). Then, the prepared transfer request command is transferred to the storage portion 1 (Step S25).

The time-out period is directly indicated in the example of the flow chart in FIG. 7. However, the time-out period may be determined as follows. Specifically, the information on the reproduction bit rate of the data requested for transfer is included in the transfer request command, and the CPU in the storage portion having received the transfer request command determines the time-out period from the bit rate information in the received command.

In addition, the storage portion includes fifteen HDDs in total in the above-described embodiment. However, the embodiment of the present invention may also be applied to a storage portion including different number of HDDs, and to a storage portion including HDDs for AV data, error correction and spare, the numbers of which are other than ten, four and one, respectively.

Further, the storage apparatus for an AV server is used in the above-described embodiment. However, the embodiment of the present invention can also be applied to other apparatuses using HDDs as storage devices for storing and reading stream data. Furthermore, the numerical values such as the time explained in the above-described embodiment are also shown as examples and are not limited to those in the above-described examples.

It should be understood by those skilled in the art that various modifications, combinations, sub-combinations and alterations may occur depending on design requirements and other factors insofar as they are within the scope of the appended claims or the equivalents thereof.

What is claimed is:

1. A data storage apparatus using a plurality of hard disk drives for storing stream data, comprising:
   a command receiving portion for receiving a stream data read command from the outside;
   a data processing portion reading the stream data stored in said plurality of hard disk drives upon receiving the read command in said command receiving portion, said data processing portion assembling the data and transferring the assembled stream data to the outside;
   a control portion performing control of determining maximum time from receiving the read command in said command receiving portion to completing the assembly of the stream data in said data processing portion, performing control of terminating the data read from said hard disk drives in the case where said maximum time has elapsed, and performing control of preparing the stream data transferred to the outside in said data processing portion only using data having been read in said data processing portion; and
   a managing portion variably setting said maximum time according to a bit rate of the stream data read on said read command.

2. A data storage apparatus according to claim 1, wherein said data processing portion restores absent data by error correction processing using the data having been read in said data processing portion, when said maximum time has elapsed, and the restored data are transferred to the outside.

3. A data storage apparatus according to claim 1, wherein said managing portion stores the bit rate of the stream data stored in said plurality of hard disk drives and variably sets said maximum time based on the stored bit rate.

4. A data storage apparatus according to claim 1, wherein data relating to the bit rate or data relating to said maximum time are added to the read command received by said command receiving portion, and said managing portion sets said maximum time based on said added data.

5. A method of reading stream data stored in a plurality of hard disk drives, comprising:
   a data processing step of reading the stream data stored in the plurality of hard disk drives upon receiving a stream data read command from the outside, assembling the data, and transferring the assembled stream data to the outside;
   a control step of determining maximum time from receiving said read command to completing the assembly of the stream data in said data processing step, terminating the data read from said hard disk drives in the case where said maximum time has elapsed, and preparing the stream data transferred to the outside only using the data having been read; and
   a managing step of variably setting said maximum time according to a bit rate of the stream data read on said read command.

* * * * *